Aug. 8, 1939.  J. A. CREW  2,169,122
METHOD FOR TREATING SANDS AND OTHER GRANULAR MATERIALS
Original Filed Feb. 5, 1935
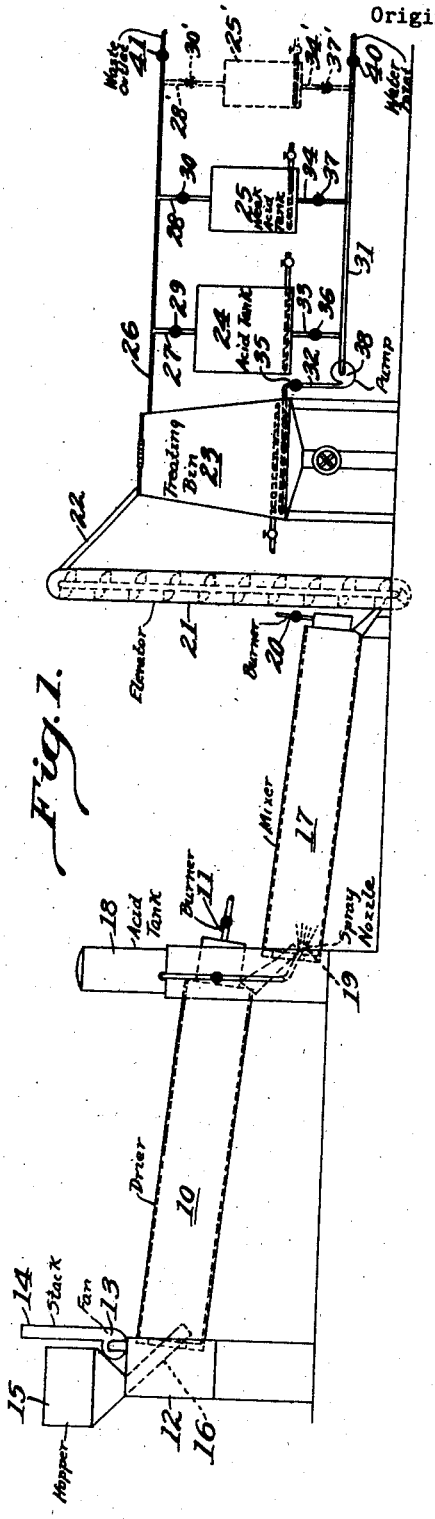
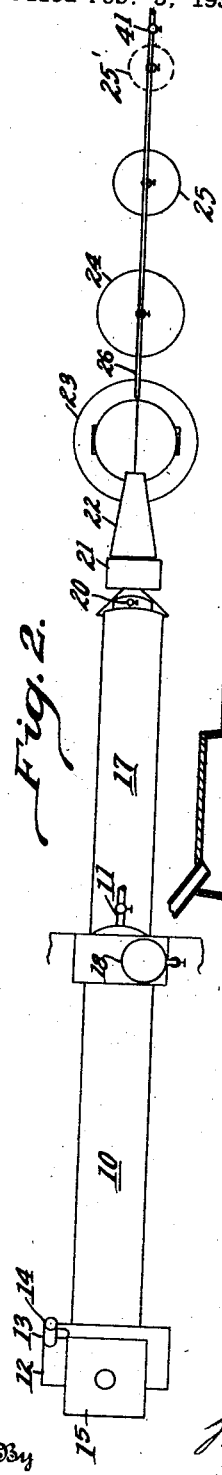
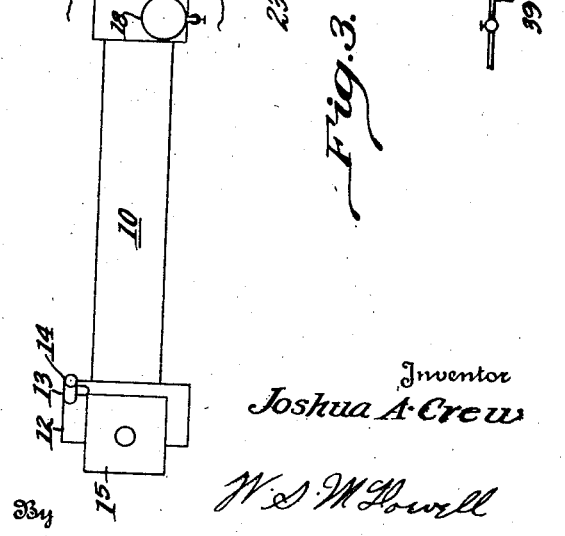
Inventor
Joshua A. Crew
W. S. M. Powell
Attorney Patented Aug. 8, 1939

2,169,122

UNITED STATES PATENT OFFICE 2,169,122

METHOD FOR TREATING SANDS AND OTHER GRANULAR MATERIALS

Joshua A. Crew, Zanesville, Ohio, assignor to The Ayers Mineral Company, Zanesville, Ohio, a corporation of Ohio Application February 5, 1935, Serial No. 5,091
Renewed December 17, 1937

11 Claims. (Cl. 252—8)

This invention relates to improvements in the treatment and refining of various raw materials, such as sands, clays, ores and other granular materials, for the purpose of removing therefrom certain undesirable naturally occurring impurities. Of these materials, sands, particularly when adapted for certain commercial uses such as in the manufacture of high grade glassware, should be substantially free from iron containing compounds which are often present in undesirably high proportions in many sand deposits. Such ferrous impurities clink tenaciously to sand particles and are often deeply lodged in the indentations and surface irregularities of the sand grains, and it is a general object of the present invention to provide an improved process, as well as apparatus, for treating such sands for the purpose of dissolving such ferrous impurities and to effect their removal from the treated sand grains.

Another outstanding object of the invention is to provide a practical, economical and efficient system for removing ferrous impurities from or reducing their content in sands, ores and various other raw materials, so that the finally treated material will possess an extremely low or negligible iron content and will be well adapted for the specific commercial uses to which the treated material is placed.

Another object is to accomplish this result with but minimum waste of the acid reagent which is used in the system for dissolving the ferrous impurities, the invention providing for recirculation of the acid reagent to permit of its repeated use and also for the removal of dissolved impurities without appreciable loss in conjunction therewith of the acid reagent.

In the accompanying drawing, I have illustrated apparatus suitable for the hereinbefore described acid treatment of raw sands or ores in the removal of ferrous impurities.

In said drawing:

Fig. 1 is a diagrammatic view, partly in side elevation and partly in vertical section of apparatus used in carrying out the invention;

Fig. 2 is a top plan view thereof;

Fig. 3 is an enlarged vertical sectional view through the treating bin and one of the associated acid tanks.

In a typical application of the present invention, the material to be treated consists of silica sand which is essentially suitable for use in glass making, or as an ingredient raw material in the manufacture of ceramic products other than glass, except for its being contaminated with iron compounds and compounds of other elements which are in themselves soluble in either sulphuric, hydrochloric or other acids or reagents. In this instance the contamination stands as an impurity, the partial or total removal of which being necessary in order that the sand may be made useful in various commercial capacities. For instance, such silica sand often contains 0.114% ferric oxide ($Fe_2O_3$), some of which occurs as hydrated iron oxide as it is mined, with the remainder occurring in the form of abrasion iron in the metallic form (Fe), gathered from the surfaces which have been in contact with the usual crushing machinery employed in mining operations. The sand, if damp, is passed through a heated drying zone which has been illustrated as comprising a rotary drier 10, suitably supported for rotation in an inclined position with respect to the horizontal, the discharge end of the drier being provided with one or more burners 11 while the upper inlet end thereof is disposed within a hood 12. The upper portion of the hood is provided with an exhaust fan 13 communicating with a flue or outlet stack 14.

The raw sand or other equivalent material is contained within a hopper 15 and is fed by means of a chute 16 into the upper end of the drier. The rotation of the drier and the passage of heated gases therethrough effects the drying of the sand and an appreciable reduction in its moisture content, so that when the sand is discharged from the lower end of the drier, it will possess a temperature preferably of the order of 160° to 220° F. and may be either in a dry or steaming condition. From the drier, the heated sand is preferably discharged by gravity into a rotary mixer 17 in the inlet of which the heated sand is mixed with sulphuric acid, or other equivalent acid reagent, the said reagent being withdrawn from a tank 18 and intimately contacted with the heated sand by being forced through the nozzle 19 disposed in or contiguous to the inlet of the mixer. This mixer may be heated by means of a burner 20 in order to maintain or increase the temperature of the sand and assist the chemical reactions, the sulphuric acid being distributed over the sand grains as nearly uniformly as possible in order to coat the individual grains with a film of the acid reagent, which reacts with the ferrous impurities present in the sand, or other material, undergoing treatment and to take the ferrous impurities into solution therewith.

The sand or other material discharged from the mixer preferably possesses a temperature varying between 180° to 220° F., the discharge of the mixer being situated to deliver the acidulated sand into the bottom of an elevator 21. When discharged from the top of the elevator, the acid treated sands gravitate, by way of the chute 22, into a bin or other receptacle 23. The acid bearing sand may be allowed to rest in the bin 23 for as long a time as practicable which will permit more complete acid action in this primary treatment. The secondary and final acid treatment of the sand consists of a thorough washing thereof with more or less dilute acid. This is accomplished by the provision of tanks 24 and 25, the tank 24 being adapted for the discharge of high strength sulphuric acid and the tank 25 for a weaker or more dilute acid. It will be apparent as the description proceeds that a greater number of tanks may be employed for the reception of successively weaker acid concentrations, as indicated at 25', and the pipe and valve connections 28', 30', 34' and 37' associated therewith.

The top of the receptacle 23 is provided with a draw-off pipe line 26, which is connected by means of branches 27 and 28 with the tanks 24 and 25 respectively, the said branches 27 and 28 being provided with control valves 29 and 30. Likewise, below the tanks 23, 24 and 25, there is provided a pipe line 31 connected by means of branches 32, 33 and 34 with the bottoms of the bin 23 and the tanks 24 and 25. The said branches 32, 33 and 34 are provided with control valves 35, 36 and 37 respectively. Also arranged in the pipe line 31 between the bin 23 and the tank 24 is a pump 38.

In imparting the secondary acid treatment to the sands or other raw materials delivered to the bin 23, following the primary treatment, all of the control valves 29, 30, 35, 36 and 37 are closed. The valve 36 is then opened which permits of the removal of the strong acid reagent from the tank 24, and the pump 38 is started, with the valve 35 open. Acid from the tank 24 flows upwardly through the sand in the bin 23, the acid being distributed through spray pipes 39 arranged in the bottom of the bin 23.

Following the flushing of the sand with the strong acid from the tank 24, the valve 29 is opened and the overflow acid from the bin 23 is returned to the tank 24. This circulation of acid from the tank 24 through the sand confined in the bin 23 is continued until the desired solution of impurities has been completed. At this time the valve 36 is closed and the valve 37 of the dilute acid tank is opened, and the more dilute acid from the tank 25 is pumped through the sand contained in the bin or receptacle 23. This operation is of relatively short duration as its fundamental purpose is merely to wash the rich acid solution that is residual in the sand from the primary washing back into the tank 24. The residual acid now in the sand is relatively weak in strength. The valve 29 is then closed and the valve 30 opened. Likewise the valve 37 is closed and water is forced through the main 31 by the opening of the control valve 40. The pump 38 then forces clear water through the sand in the tank 23, and the weak residual acid in the sand is forced through the overflow line 26 into the tank 25. When the quantity so returned to the tank 25 has reached the desired level, the valve 41 in the overflow line is opened and the valve 30 closed, and the pumping of water through the sand is continued until the sand is free from acid and the final washings have been run to waste through pipe lines associated with the valve 41.

In the above treatment, a considerable amount of impurities that occur as a stain on the sand grains are dissolved by acid added to the mixer 17 in the primary treatment. However, heavy incrustations of impurities of greater thickness and, also, especially actual grains of impurity are only superficially dissolved in this primary operation, and herein lies the value of the secondary operation of subsequent prolonged washing of the already acidulated sand by circulating strongly active acid solution from the tank 24 through the sand in the receptacle 23. In the primary operation, a thin film of acid is exhausted as soon as it has dissolved a proportionately thin film of impurity. In the case of impurities of relatively great thickness, it will be seen therefore, that only the outside thereof is attacked by the acid in the primary treatment and thereby converted into a form soluble in water and removable from the sand by the final washing operation. The heart of the impurity and in many cases the greater proportion of it is unaffected in the primary treatment and would therefore carry through into the finished product with resultant contamination thereof.

In order to correct this and attain the greatest amount of purification, the secondary operation of continuous circulation of highly active acid solution from the tank 24 through the sand in the receptacle 23 is used. In this operation fresh quantities of acid are continuously brought into intimate contact with the heavy impurity and it is dissolved in its entirety insofar as it is soluble at all. The acid in the tank 24 really does most of the cleaning in the secondary operation, while the acid in the tank 25, or in other subsequent similar tanks, is pumped through the sand more to conserve acid by gradually decreasing the acid content of the final solution that is residual in the sand just before the waste valve 41 is opened and the final residual sent to waste. This final residual, however, will be very low in acid content since the main body of the acid reagent in the secondary operation is repeatedly used and recirculated so that the acid loss of the system will be rendered correspondingly low. The use of the tank 24 enables the system to utilize with minimum loss the strong acid imparted to the sand grains in the primary operation.

While I prefer to preheat the sand prior to its introduction into the treating bin, I find this procedure very beneficial when sulphuric acid, or solutions thereof are employed as the acid reagent, nevertheless, in another variation of my invention, I have found that the sand may be treated while cold when in the treating bin with the use of muriatic or hydrochloric acid.

As stated, it is sometimes advisable to use two or more of the weak acid tanks 25, in order to obtain stronger acid in the receptacle 23 and to minimize final acid loss in the waste. This is more particularly true where solutions of the tanks 25 are recirculated time and time again through sand in the receptacle 23 with the overflow returning to the same tank that is open to the pump 38. In most operations, it is preferable to pump from the tank 25 only approximately the number of gallons of solution that are residual in sand disposed in the receptacle 23, this quantity gradually passing through the distributing pipes 39 and rising through the sand to displace the stronger residual acid which is forced through the overflow 26 to the top of the tank 24, the strong acid tank. The dilute acid tank is then shut off from the pump and either a third tank, or outside acid-free water pumped through the spray coil 39 to displace the residual acid drawn from the tank 25, which is in turn forced through the overflow pipe to the tank 25 through the valve 30. The final residual then consists principally of straight water with some acid from tank 25 residual that may remain by diffusion, channelling of upper currents, etc. It is this final residual that maintains the equilibrium of the process by carrying off the accumulated dissolved impurities and other soluble constituents originally contained in the sand, thereby preventing overloading of the acid solutions with the salts which would interfere with the cleaning strength of the solutions.

The acid tanks are preferably equipped with means for heating the acid solution, such for instance as by means of steam pipes, and the exteriors of the tanks may be equipped with insulation to prevent undue loss of heat.

The secondary operation can be conducted more or less alone as by by-passing the mixer 17 and eliminating the primary acid treatment. The sand would then pass from the drier 10 directly to the tank 23. In this case much higher temperatures of drier discharge can be used, as high as 500° F. or higher, and the acid is added direct to the tank 24 together with water to make desired solution strength.

The secondary operation can be carried out satisfactorily in series with the complete primary operation. For instance, damp sand fed to the drier 10 is fully dried therein or only partially dried, but in all cases the sand is considerably heated up, as indicated by the temperatures given above. Damp sand acidulated with concentrated or dilute acid can be fed into the drier 10 and discharged either sensibly dried or sensibly moist; in this case the product will go directly to the tank or receptacle 23. Again, the drier 10 can be used as a mixer and the acid added either at the feed end zone or near the discharge end zone. The feed to the mixer can be either hot sand, sensibly dry or hot sand sensibly moist. In either case, acid (concentrated or dilute) can be added in the mixer. The mixer can be heated by external means, direct or indirect, or operated with no heat other than that contained in the sand introduced into it. Typical examples of mixer operation are as follows:

Feed dry sand 450° F. which is sprayed in mixer with 20% sulphuric acid solution, mixer discharge temperature being reduced largely by evaporation of water to 200° F. or thereabouts.

Feed 220° F. approximately dry sand which is sprayed in mixer with concentrated acid with a discharge temperautre of the order of 190° F. Again, hot damp sand may be fed to the mixer, usually at a temperature not over 212° F., and sprayed in mixer with concentrated sulphuric acid, discharge temperature either higher by means of supplied heat to the mixer or lower. Also, hot damp sand may be fed to the mixer and sprayed with dilute acid, and some moisture evaporated by means of heat suitably supplied to the mixer, for instance, as by the burners 20.

One of the important features of the present invention, therefore, is the provision of a system for reducing the acid retained in the residual solution of the same particularly at the time of the final flushing operation. By the advancing stages of rinsing through using solution from each tank of progressively lesser strength, and finally the water main water to displace the residual and return it to the tank ahead, the strength of the acid in the tanks 24 and 25 is kept high without upsetting the equilibrium of the system.

When volatile acids are used, the mixer should be by-passed or if used provision should be made to draw off the gas vapor and recover it by any preferred method.

A typical example of the effectiveness of the above process is shown in the following analysis of an iron-bearing sand treated as above indicated.

|  | Iron oxide content per cent |
|---|---|
| Before any treatment | 0.170 |
| As treated by the primary process above described | 0.050 |
| As treated by a primary process followed by a secondary process using sulphuric acid | 0.026 |
| As treated by sulphuric acid in the primary process followed by a secondary process using hydrochloric acid | 0.015 |

Strengths of acid solutions in the tanks 24 and 25 and others depend on several factors and are capable of considerable variation. Some factors are: amount of acid added per ton of sand in primary operation; degree of circulation of weaker solutions following the use of the strong acid in the tank 24; the number of tanks used. I prefer a smaller number of tanks with close control of quantity of acid reagent pumped up through the sand after the main wash with the strong acid from the tank 24. In fact, just the two tanks 24 and 25 make a thoroughly practical layout, tank 24 having twice the capacity of tank 25, and tank 25 having ample capacity to hold eighty-five gallons of solution per ton of sand in the receptacle 23. When the process is applied to ores to recover valuables from solution, the same general procedure is used except that the desired valuable is thrown out of solution by various methods such as precipitation, by adding a proper precipitant, electrolysis of the solution or the like.

What is claimed is:

1. In a process for removing ferrous impurities from sand, the steps which comprise: establishing a bed of heated acidulated sand, forcing a relative strong acid solution upwardly through said bed of sand, displacing the strong acid solution from said sand by passing a weaker acid solution therethrough, returning the displaced strong acid solution to its source of supply, displacing the weaker acid solution from said sand by passing water therethrough, and returning the displaced weaker acid solution to its source of supply.

2. In a process for removing ferrous impurities from sand, the steps which comprise: establishing a bed of acid coated sand, forcing a relative strong acid solution upwardly through said bed of sand, displacing the strong acid solution from said sand by passing a weaker acid solution therethrough, returning the displaced strong acid solution to its source of supply, displacing the weaker acid solution from said sand by passing water therethrough, and returning the displaced weaker acid solution to its source of supply.

3. In a process for removing ferrous impurities from sand, the steps which comprise: establishing a bed of sand, forcing a relative strong acid solution upwardly through said bed of sand, displacing the strong acid solution from said sand by passing a weaker acid solution therethrough, returning the displaced strong acid solution to its source of supply, displacing the weaker acid solution from said sand by passing water therethrough, and returning the displaced weaker acid solution to its source of supply.

4. In a process for removing ferrous impurities from sand, the steps which comprise: establishing a bed of sand, forcing a relative strong acid solution through said bed of sand, displacing the strong acid solution from said sand by passing a weaker acid solution therethrough, returning the displaced strong acid solution to its source of supply, displacing the weaker acid solution from said sand by passing water therethrough, and returning the displaced weaker acid solution to its source of supply.

5. In a process for removing ferrous impurities from sand, the steps which comprise: heating a body of sand containing such ferrous impurities, establishing a bed of the heated sand, forcing a relatively strong acid reagent through said bed of heated sand, displacing the strong acid solution from said sand by passing a weaker acid solution therethrough, returning the displaced strong acid solution to its source of supply, displacing the weaker acid solution from said sand by passing water therethrough, and returning the displaced weaker acid solution to its source of supply.

6. In a process for removing ferrous impurities from sand, the steps which comprise preheating a body of such sand in the absence of an acid, then introducing into the sand a quantity of sulphuric acid to produce on the sand grains a film of such acid, establishing a bed of such acid treated sand, forcing a relative strong acid solution therethrough for a desired period of time, displacing the strong acid solution from said bed by passing a weaker acid solution therethrough, and returning the strong acid solution to its source of supply, displacing the weaker acid solution from said bed by water and returning the displaced weaker acid solution to its source of supply, and continuing to wash the sand with water to remove the said soluble impurities therefrom.

7. In a process for removing impurities from sand, the steps which comprise: establishing a bed of sand, passing a strong reacting solution through said bed of sand, displacing the strong solution from said sand by the pressure of passing a weaker reacting solution therethrough, and then displacing the weaker solution from said sand, and returning by such displacement the reaction solutions to their respective sources of supply.

8. In a process for removing impurities from sand, the steps comprising establishing a bed of sand, passing a reacting solution through said bed of sand to remove impurities therefrom, displacing said solution from said sand by the pressure of passing another solution therethrough, and then displacing the second solution from said sand by the pressure of passing a third solution therethrough, and returning by such displacements the reacting solutions to their respective sources of supply.

9. In a process for removing impurities from sand, the steps comprising establishing a bed of sand, passing a relatively strong solution through said bed of sand to react with impurities therein, and displacing the relatively strong solution from said sand by the pressure of passing a second solution therethrough, and returning the strong solution by such displacement to its source of supply.

10. In a process for removing impurities from sand, the steps comprising establishing a bed of sand, treating said bed of sand in situ by passing an impurity removing solvent through said bed of sand, and displacing said solvent from the sand by the pressure of passing another solution therethrough, and returning the solution by such displacement to its source of supply.

11. In a process for removing impurities from sand, the steps which comprise drying the sand, treating the dried sand with a reagent for removing impurities, forming a bed of said treated sand, passing an additional reagent through said bed of sand, and then displacing said additional reagent from said bed of sand by passing a solution under pressure therethrough, and returning the displaced reagent to its source of supply.

JOSHUA A. CREW.